April 16, 1946.  S. J. NORDSTROM  2,398,444

PLUG VALVE CLOSURE

Filed Dec. 23, 1943

Inventor
SVEN J. NORDSTROM
By Lewis D. Konigsford
Attorney

Patented Apr. 16, 1946

2,398,444

UNITED STATES PATENT OFFICE 2,398,444

PLUG VALVE CLOSURE

Sven J. Nordstrom, Lafayette, Calif., assignor to Merco Nordstrom Valve Company, Pittsburgh, Pa., a corporation of Delaware Application December 23, 1943, Serial No. 515,388

7 Claims. (Cl. 251—112)

This invention relates generally to valves and relates in particular to plug valves of the tapered type. The invention in particular is an improvement on the construction shown and claimed in my prior Patent No. 2,144,080.

It is an object of the present invention to provide an improved closure for a valve body which will withstand relatively high pressure, and which may be readily removed for inspection or repairs of the valve.

Another object of the present invention is to provide an improved sealing means having particular applicability to plug valves for closing the seat thereof.

A further object is the provision of an improved valve plug sealing means for resiliently maintaining the valve plug on its seat and adjusting the seating pressure thereof which is applicable to valves of large sizes and for high pressures.

Figure 2:
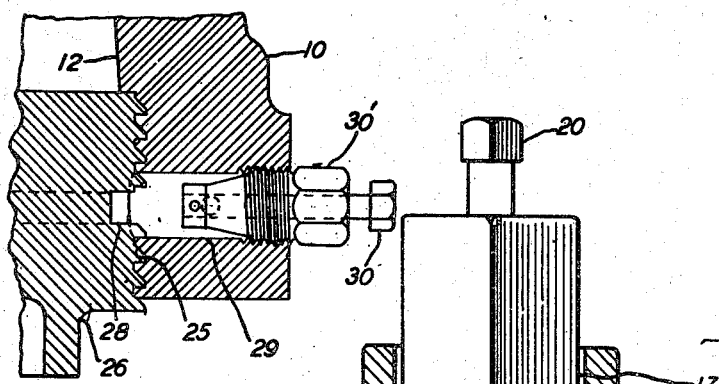
Figure 1:
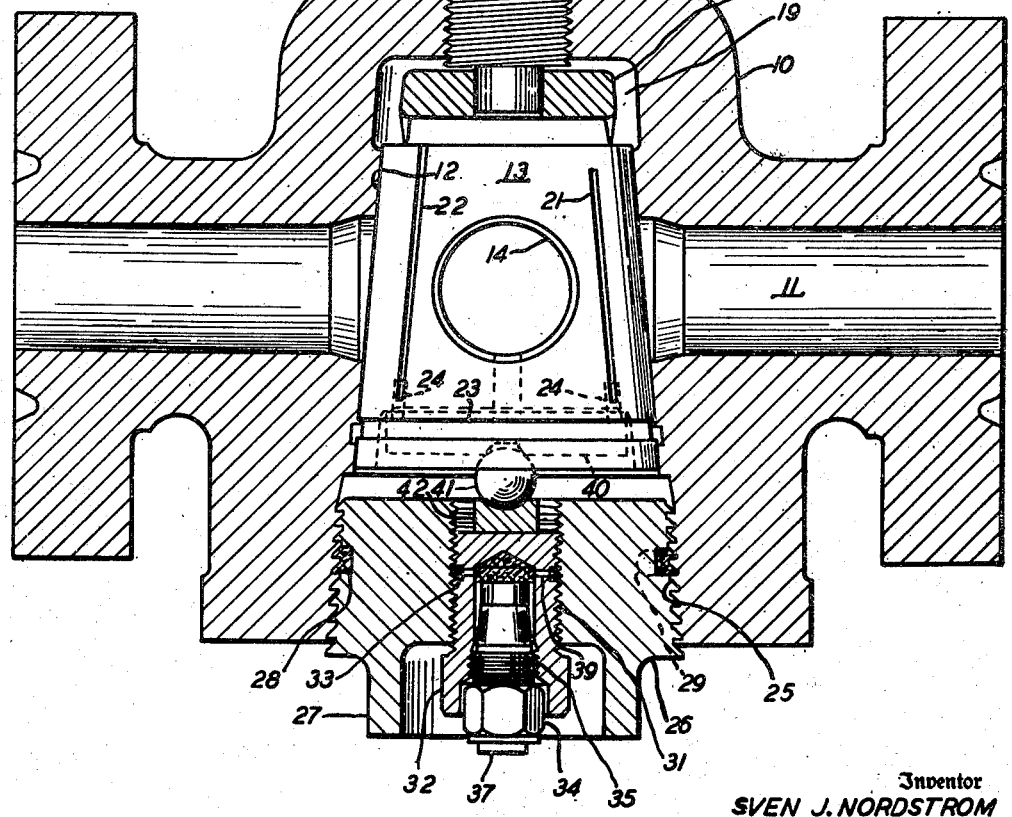

The invention will be described in greater detail in connection with the accompanying drawing wherein is shown a preferred embodiment of the invention by way of example, and wherein Figure 1 represents a vertical section taken through a plug valve, and Figure 2 is a fragmentary section at right angles to Figure 1.

Referring to the drawing the valve shown in the preferred embodiment is of the plug type and comprises a body or casing 10 having a longitudinal passageway 11 therethrough for flow of fluid and adapted to be connected to a fluid pipe line by means of flanges or the like. A seat 12, which preferably is tapered, is formed in the casing transversely of the passageway, and a plug 13, which preferably also is tapered, is seated in the seat 12 and has a port 14 therethrough adapted to register with the passageway 11 for open position of the valve. The casing 10 has an extension 16 at one end into which is threaded an operating stem 17 which forms an operative connection with the valve plug 13 at the smaller end by means of a coupling member 18 of the Oldham type. Lubricant is supplied to the chamber 19 formed at the smaller end of the seat 12 through a threaded bore (not shown) in the valve stem and the lubricant is placed under compression by means of the screw 20 threaded into the bore. The bore may contain a suitable check valve to prevent refluxing of the lubricant. Lubricant is supplied to the valve by screw 20 into chamber 19 and is distributed over the valve surface by the grooves 21, 22 and 23 which are interconnected in certain positions by the connecting or dwarf grooves 24.

The casing 10 at the larger end of the seat has a threaded bore indicated at 25 which may be tapered if desired, and a threaded plug or closure member 26 is threaded therein. The threaded plug member 26 has a non circular end 27 by which it may be rotated by a wrench or the like, and has a groove 28 formed in its periphery intermediate its ends. Suitable packing is supplied to the groove 28 through a substantially tangential passage 29 in the casing 10 registering therewith and the packing may be forced through this passageway into the groove 28 by a screw 30 in check valve fitting 30' or by any other suitable type of compressor. The threads at the joint between the closure plug 26 and the body are preferably of the type having at least one face substantially normal to the axis of the closure plug the apex angle being relieved as required. The threaded plug 26 has a central threaded bore 31 in which is threaded an adjustment screw member 32, the threaded joint between the plug and adjustment screw being sealed by packing in a suitable annular groove or recess 33. A check valve body 34 is threaded into a bore 35 in the adjustment screw and may contain a suitable compression screw 37 which compresses the packing in bore 35 and supplies it through radial ducts 39 into the annular groove 33.

The larger end of valve plug 13 has a plate 40 suitably supported to engage a thrust ball 41 which is held in position by a thrust block 42 bearing against adjustment screw 32 whereby rotation of screw 32 adjusts the seating pressure on the plug. If desired the bore 31 and plug 32 may be omitted in which case plug 26 will be made solid.

From the foregoing description it will be apparent that the larger end of the seat is closed by the threaded plug 26 which is screwed home, in the case where parallel threads are employed, and is sealed by the packing under compression in the annular chamber 28. By reason of the engaging normal faces of the thread in the bore 25 and on the plug 26 the outward thrust upon the plug 26 exerted by line pressure has substantially no component normal to the axis of the plug, and thus the threads have no wedging action tending to deform the body by spreading the hole 25. Such deformation is particularly objectionable in a plug valve because it is liable to cause deformation of the seat from a true cone and thus cause leakage past the plug, or binding of the plug in its seat. The smaller plug 32 may be adjusted to vary the seating thrust of plug 13 on its seat to obtain the desired ease of turning.

What I claim as my invention and desire to secure by Letters Patent is:

1. A valve comprising a casing having a passageway therethrough for flow of fluid and a seat formed transversely of the passageway, a valve plug in said seat having a port therethrough adapted to register with the passageway in open position of the valve, a bore in the casing extending from the exterior to the valve seat, said bore being threaded with threads providing an internal face substantially normal to the axis of said bore, a removable cover threaded with threads providing an external face substantially normal to the axis of the bore, there being a recess interrupting the threaded engagement of said threaded bore and cover, and means for introducing plastic, non-setting sealing material under pressure to said recess to seal the joints between said cover and casing said threaded engagement between the bore and cover being such as to prevent deformation of the bore and consequent distortion of said seat.

2. A valve body comprising a passageway for flow of fluid through the body and a seat formed transversely of the passageway, a valve member cooperating with said seat to control flow through the valve, said body having a bore extending from the exterior to the passageway, said bore being threaded with screw threads providing an internal face substantially normal to the axis of said bore, a removable cover screw threaded with threads providing an external face substantially normal to the axis of said bore, there being a recess interrupting the threaded engagement of said threaded bore and cover, and means for introducing plastic non-setting sealing material under pressure to said recess to seal the joint between said cover and casing said threaded engagement between the bore and cover being such as to prevent deformation of the bore and consequent distortion of said seat.

3. In a valve assembly, a hollow valve body having an internal chamber formed with a valve seat in the form of a surface of revolution, a displaceable valve member having a face adapted to contact said seat, a threaded bore communicating with said chamber and coaxial with said seat, and a closure member threaded in said bore adapted to engage and force said valve against said seat, the load carrying surfaces of the cooperating threads of said bore and closure member being composed of substantially radial elements normal to the axis of said bore, whereby substantial deformation of the adjacent valve seat is avoided.

4. In the valve assembly defined in claim 3, the threaded engagement between said bore and closure member being interrupted by an annular zone containing a plastic material under pressure for sealing against leakage.

5. In a valve plug assembly, a hollow valve body having an internal chamber formed with a valve seat in the form of a surface of revolution, a rotatable valve plug adapted to engage said seat, a buttress threaded bore communicating with said chamber and a buttress threaded closure member for said bore adapted to engage and force said plug against said seat, whereby deformation of said bore and consequent distortion of the valve seat under high internal pressures in said chamber are avoided.

6. In a valve, a movable valve member, a valve body having an internal valve seat for said member and a bore axially aligned with said valve member and terminating at its inner end adjacent to said seat, a closure member for said bore, said closure member and bore having cooperative buttress type threads opposing axial displacement of said closure member by high internal pressure and preventing substantial radial deformation of the wall of said bore and transmission of distorting stresses therethrough to the valve seat.

7. A valve body closure as defined in claim 6, in which means is provided for retaining a plastic sealing material under pressure between the threaded bore of the valve body and said closure member.

SVEN J. NORDSTROM.